(12) United States Patent
Niiyama

(10) Patent No.: US 11,385,497 B2
(45) Date of Patent: Jul. 12, 2022

(54) MIRROR SURFACE DISPLAY DEVICE AND LIGHT REFLECTING AND TRANSMITTING MEMBER

(71) Applicant: AGC Inc., Chiyoda-ku (JP)

(72) Inventor: Satoshi Niiyama, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 17/348,215

(22) Filed: Jun. 15, 2021

(65) Prior Publication Data

US 2021/0311358 A1    Oct. 7, 2021

Related U.S. Application Data

(63) Continuation of application No. 16/038,905, filed on Jul. 18, 2018, now Pat. No. 11,048,115, which is a
(Continued)

(30) Foreign Application Priority Data

Jan. 20, 2016   (JP) .............................. JP2016-009265

(51) Int. Cl.
*G02F 1/1335*   (2006.01)
*G02F 1/13*     (2006.01)
(Continued)

(52) U.S. Cl.
CPC ......... *G02F 1/133553* (2013.01); *G02B 5/30* (2013.01); *G02F 1/13* (2013.01);
(Continued)

(58) Field of Classification Search
CPC .... G02F 1/133553; G02F 1/13; G02F 1/1335; G02F 1/133512; G02F 1/133528;
(Continued)

(56) References Cited

U.S. PATENT DOCUMENTS 6,767,594 B1 *  7/2004  Miroshin ............. G02B 5/3083
                                                    428/1.31
2003/0099009 A1   5/2003  Noda et al.
(Continued)

FOREIGN PATENT DOCUMENTS

JP    2001-42250    2/2001
JP    2003-161820   6/2003
(Continued)

OTHER PUBLICATIONS

Extended European Search Report dated May 10, 2019 in Patent Application No. 17741501.5, 8 pages.
(Continued)

*Primary Examiner* — Charles S Chang
(74) *Attorney, Agent, or Firm* — Oblon, McClelland, Maier & Neustadt, L.L.P.

(57) ABSTRACT

Each of a mirror surface display device and a light reflecting member includes a support member having an optical thin film thereon, a broadband selective reflection film and a display in this order; the optical thin film being formed on a surface of the support member facing the broadband selective reflection film; and the broadband selective reflection film being a film selectively transmitting one of clockwise circularly polarized light and counterclockwise circularly polarized light, and selectively reflecting the other polarized light, and having cholesteric regularity.

17 Claims, 3 Drawing Sheets

Related U.S. Application Data continuation of application No. PCT/JP2017/001801, filed on Jan. 19, 2017.

(51) Int. Cl.
    *G02F 1/1333*     (2006.01)
    *G09F 9/00*     (2006.01)
    *G02B 5/30*     (2006.01)

(52) U.S. Cl.
    CPC ...... *G02F 1/1335* (2013.01); *G02F 1/133512* (2013.01); *G02F 1/133528* (2013.01); *G09F 9/00* (2013.01); *G02F 1/133354* (2021.01); *G02F 1/133543* (2021.01)

(58) Field of Classification Search
    CPC ......... G02F 1/133543; G02F 1/133354; G02B 5/30; G09F 9/00
    USPC .................................................. 349/96–98
    See application file for complete search history.

(56) References Cited

U.S. PATENT DOCUMENTS

| | | | | |
|---|---|---|---|---|
| 2007/0014127 | A1* | 1/2007 | Hara | G02B 6/005 362/611 |
| 2009/0290079 | A1 | 11/2009 | Evans et al. | |
| 2010/0177113 | A1 | 7/2010 | Gay et al. | |
| 2011/0037922 | A1 | 2/2011 | O'Neill et al. | |
| 2013/0222732 | A1 | 8/2013 | O'Neill et al. | |
| 2014/0347604 | A1 | 11/2014 | O'Neill et al. | |
| 2016/0026039 | A1* | 1/2016 | Sakai | G02F 1/133555 345/1.3 |
| 2016/0214285 | A1 | 7/2016 | Taguchi et al. | |
| 2018/0011229 | A1 | 1/2018 | Fukui et al. | |
| 2019/0056540 | A1 | 2/2019 | Taguchi et al. | |

FOREIGN PATENT DOCUMENTS

| | | |
|---|---|---|
| JP | 2005-352273 | 12/2005 |
| JP | 2009-534692 | 9/2009 |
| JP | 2011-45427 | 3/2011 |
| JP | 2013-72985 | 4/2013 |
| JP | 2015-72410 | 4/2015 |
| JP | 2015-95183 | 5/2015 |
| JP | 2017-15897 | 1/2017 |
| WO | WO 2014/112525 A1 | 7/2014 |
| WO | WO 2016/133187 A1 | 8/2016 |
| WO | WO 2016/194890 A1 | 12/2016 |

OTHER PUBLICATIONS

International Search Report dated Mar. 21, 2017 in PCT/JP2017/001801, filed on Jan. 19, 2017 (with English Translation).

* cited by examiner

MIRROR SURFACE DISPLAY DEVICE AND LIGHT REFLECTING AND TRANSMITTING MEMBER

This application is a Continuation of U.S. application Ser. No. 16/038,905, filed on Jul. 18, 2018, which is a continuation of PCT/JP2017/001801, filed on Jan. 19, 2017, which claims priority to JP 2016-009265, filed on Jan. 20, 2016.

TECHNICAL FIELD

The present invention relates to a mirror surface display device and a light reflecting and transmitting member which allow a ray of display and mirror-reflected light to be visible.

BACKGROUND ART

As the information society in recent years is progressing, various kinds of displays including a liquid crystal display have been widely spread, and these displays have had a higher function and a higher added value in a rapid pace. For example, there has been known a mirror surface display, which has a half mirror formed on a front surface side thereof and has a mirror function added thereto so as to show a mirror-like appearance.

As an example of the use of a half mirror, there has been disclosed a mirror-like electrostatic capacitive touch panel, which includes a mirror-like base material having a transparent and insulating planar material with a conductive metallic thin film formed on a back surface thereof so as to serve as an optical reflection layer and can specify the position of an input operation body in touch with or approaching toward a front surface side of the mirror-like base material (Patent Document 1).

PRIOR ART DOCUMENT

Patent Document

Patent Document 1: JP-A-2015-95183

DISCLOSURE OF INVENTION

Technical Problem

Although the mirror surface display utilizes a half mirror to achieve a reflection function and a transmission function, it is impossible for the total amount of the reflectance and the transmittance of the half mirror to exceed 100% with respect to normal incident light. From this point of view, the conventional mirror surface display needs to utilize a metallic thin film or a dielectric thin film so as to be configured to increase the luminance of a ray of display with a mirror-like appearance being ensured. When the mirror surface display is a liquid crystal display, it is possible to increase the illuminance of backlight to raise the visibility of the ray of display. Nevertheless, an increase in the illuminance inevitably leads to an increase in heat generation from the backlight, which makes it necessary to dispose a heat-radiating system or the like so as to prevent the display from being excessively heated.

A display having a high resolution can be utilized to increase the display quality of the mirror surface display. Nevertheless, when the display is a transmissive display having a high resolution, the display panel is likely to have a low transmittance because thin film transistors and other elements required to drive fine pixels have a high occupancy rate in a display surface. For this reason, it becomes further difficult to increase the luminance of a ray of display in the use of a mirror surface display.

The present invention is proposed in consideration of such circumstances. It is an object of the present invention to provide a light reflecting and transmitting member, and a mirror surface display device, which achieve a mirror property and a display property in a common region and increase the total amount of a reflectance and a transmittance.

Solution To Problem

The present invention includes the following modes:

1. A mirror surface display device including a support member having an optical thin film, a broadband selective reflection film thereon and a display in this order; the optical thin film being formed on a surface of the support member facing the broadband selective reflection film; the broadband selective reflection film being a film selectively transmitting one of clockwise circularly polarized light and counterclockwise circularly polarized light, and selectively reflecting the other polarized light, and having cholesteric regularity.

2. The mirror surface display device recited in item 1, wherein a ray of display incident on the broadband selective reflection film from the display is circularly polarized light having the same circling direction as circularly polarized light that is allowed to selectively pass through the broadband selective reflection film.

3. The mirror surface display device recited in item 1 or 2, wherein the support member and the broadband selective reflection film have a larger area than the display; and the broadband selective reflection film has a light-shielding layer in a region that does not face the display.

4. The mirror surface display device recited in item 3, wherein the broadband selective reflection film and the display face each other via an air layer; and the light-shielding layer faces, via an air layer, the region that does not face the display.

5. The mirror surface display device recited in item 3, wherein the broadband selective reflection film and the display are bonded together via a second transparent bonding material, and the light-shielding layer is formed, not via the air layer on the broadband selective reflection film in the region that does not face the display.

6. The mirror surface display device recited in item 4 or 5, further including a retardation film interposed between the broadband selective reflection film and the light-shielding layer.

7. The mirror surface display device recited in any one of items 1 to 6, wherein the broadband selective reflection film and the support member are bonded together via a first transparent bonding material, and the first transparent bonding material has a smaller thickness than a pitch of display pixels of the display.

8. The mirror surface display device recited in any one of items 5 to 7, wherein each of the first transparent bonding material and the refractive index of the second transparent bonding material is 0.8 to 1.3 times that of the support member and a shear elastic modulus of $10^3$ to $10^7$ Pa at 25° C.

9. The mirror surface display device recited in any one of items 1 to 8, wherein the support member is made of a transparent material having a transmission of at least 20% in a visible light band.

10. The mirror surface display device recited in any one of items 1 to 9, wherein the support member is made of inorganic glass.

11. The mirror surface display device recited in any one of items 1 to 10, wherein the display is a liquid crystal display, and the liquid crystal display includes a liquid crystal display panel and a light source for emitting light to the liquid crystal display panel, the liquid crystal display panel having a liquid crystal layer interposed between paired substrates, and paired polarizing plates formed on each outside principal face of the liquid crystal display panel.

12. The mirror surface display device recited in any one of items 1 to 11, wherein the optical thin film includes a dielectric multilayer film and has a light reflectance of at least 60% for a wavelength of 550 nm.

13. The mirror surface display device recited in any one of items 1 to 12, wherein the broadband selective reflection film has a reflection band in wavelength of at least 150 nm.

14. A light reflecting and transmitting member including a support member having an optical thin film, and a broadband selective reflection film in this order; and the optical thin film being formed on a surface of the support member facing the broadband selective reflection film; the broadband selective reflection film being a film selectively transmitting one of clockwise circularly polarized light and counterclockwise circularly polarized light, and selectively reflecting the other polarized light, and having cholesteric regularity.

15. A window member using the light reflecting and transmitting member recited in item 14.

Advantageous Effects of Invention

The present invention has an excellent advantage of providing a mirror surface display device and a light reflecting and transmitting member, which can achieve a mirror property and a display property in a common region and increase the total amount of a reflectance and a transmittance in comparison with the prior art.

DESCRIPTION OF EMBODIMENTS

Now, explanation will be made about examples of embodiments with the present invention applied thereto. The sizes and the ratios of the respective members or to elements shown in the accompanying drawings are depicted merely for convenience of explanation. The respective members or elements are not limited to those having such sizes or ratios.

The following explanation and the accompanying drawings are properly given in a schematic or simplified way in order to clarify the explanation.

First Embodiment

Figure 1:
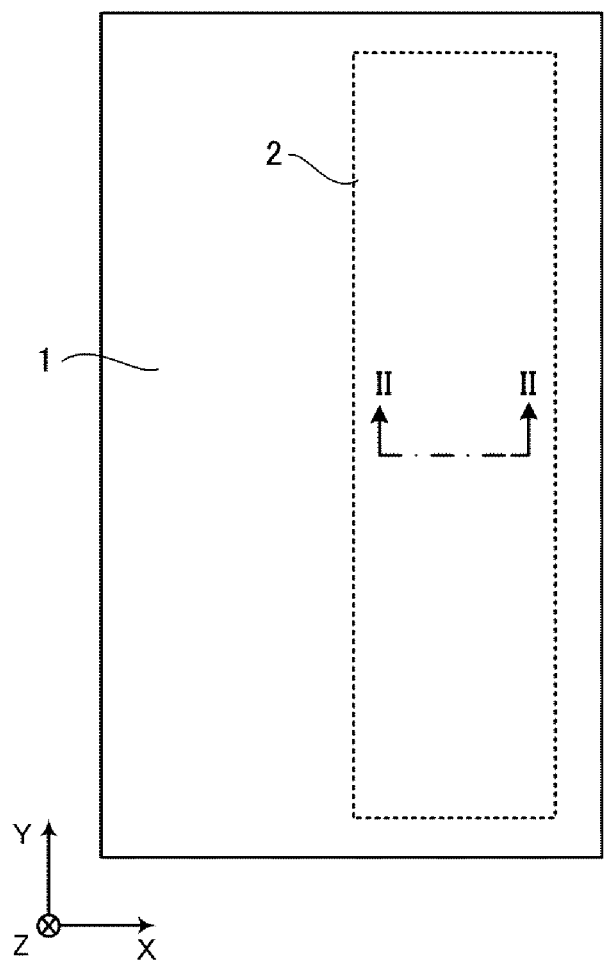
FIG. 1 is a schematic top plan view of the mirror surface display device according to a first embodiment of the present invention.
Figure 2:
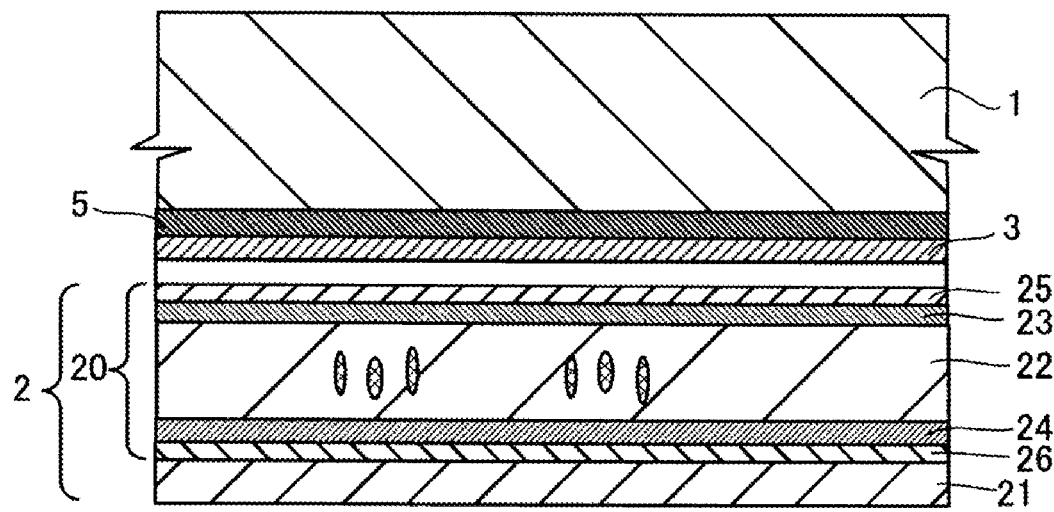
FIG. 2 is a cross-sectional view taken along line II-II of FIG. 1.

FIG. 1 is a schematic top plan view of the mirror surface display device according to a first embodiment of the present invention, and FIG. 2 is a cross-sectional view taken along line II-II of FIG. 1.

The mirror surface display device 101 includes a support member 1 having an optical thin film 5 formed thereon, a display 2 mounted to the support member 1, and a broadband selective reflection film 3 interposed between the support member 1 and the display 2. As shown in FIG. 2, the support member 1 and the broadband selective reflection film 3 are bonded together without interposing an air layer therebetween. The broadband selective reflection film 3 and the display 2 face each other via an air layer. Hereinbelow, explanation will be made such that a surface of each of the support member 1 and the broadband selective reflection film 3 facing the display 2 is called a rear surface while the other surface of the support member 1 remote from the display 2 is called a front surface.

The mirror surface display device 101 has a mirror function as well as a display function in a display area of the display 2. A viewer in front of the front surface of the support member 1 visually recognizes a mirror image and a display image on the display. In other words, the mirror surface display device appears to be a mirror when the display is not energized, while a viewer can visually recognize a display image on the display 2 when the display is energized.

The support member 1 is made of a base material which is transparent in at least a region with a ray of display passing therethrough. The base material may be planar or curved. The wording "transparent" means to have a transmittance of at least 20%, preferably at least 70%, more preferably at least 80% in a visible light band, and to include colorless transparent and colored transparent. Appropriate examples of the support member 1 include inorganic glass and a plastic material, such as acrylic resin or polycarbonate. Laminate glass is also applicable. The support member may be made of a composite material where the region with a ray of display passing therethrough is made of glass while the remaining region is made of another member. In other words, the support member 1 may be made of various kinds of materials and have various kinds of shapes in a range not departing from the spirit or scope of the present invention.

The support member 1 has the optical thin film 5 formed thereon to achieve a half mirror function. The half mirror passes part of light therethrough as it is and reflects the remaining part on its mirror surface. The reflectance and the transmittance of the half mirror may be equal to each other, and the transmittance may be higher than the reflectance or vice versa. Although the transmittance and the reflectance may be variable according to need, the transmittance is preferably higher than the reflectance to achieve a mirror surface.

The optical thin film 5 has a light reflectance of preferably at least 60%, more preferably at least 65%, much more preferably at least 70% at a wavelength of 550 nm to obtain a reflection image similar to a reflection image produced by a normal mirror surface.

For example, the optical thin film 5 is preferably a metallic thin film, such as an aluminum thin film, a metallic oxide film or a dielectric multilayer film, which partly transmits incident light without completely reflecting the incident light. In particular, the optical thin film 5 is preferably a dielectric multilayer film from the viewpoint of easy control in the ratio of the reflectance and the transmittance.

The optical thin film 5 may be formed by a known method. The optical thin film 5 may be formed directly on the support member 1 or may be formed on a transparent base material, such as a resin film, followed by being made to adhere to the support member.

When the optical thin film 5 is a metallic thin film, the metallic film may have a transparent protection film, such as an organic thin film, formed as an upper layer thereon in order to protect the metallic thin film. The thickness of the metallic thin film may be properly designed according to a desired transmittance. When the mirror surface display device 101 is equipped with a touch panel, the metallic thin film formed as the optical thin film 5 may be utilized as sensor electrodes or a part of the sensor electrodes.

Although there is no limitation to the display 2 as long as the display is a device which emits a ray of display toward a front surface of the support member 1, a flat panel display, such as a liquid crystal display, an organic EL display or a plasma display, is appropriate. The display 2 preferably contains a polarized component in the emitted light therefrom. The display 2 displays an image stored in a memory (not shown) or an image transmitted from, for example, a computer, a server or the like connected the display via a network. The support member 1 may be equipped with a plurality of displays 2. The support member may have a display area formed in a rectangular shape shown in FIG. 1 or in another shape.

The broadband selective reflection film 3 is a film, which selectively transmits one of clockwise circularly polarized light and counterclockwise circularly polarized light and selectively reflects the other polarized light in a specific wavelength band, which has cholesteric regularity, and which includes a single layer or a plurality of layers. In Description, the broadband selective reflection film means a film that selectively transmits one of clockwise circularly polarized light and counterclockwise circularly polarized light and selectively reflects the other polarized light in a band of at least 150 nm in a visible light band. From the viewpoint of providing the selective reflection film with an improved reflection property, such as controlled coloring of reflected light, the broadband selective reflection film has a selection reflection band covering the entire band of visible light (from 400 to 750 nm). In Description, the broadband selection reflection film is supposed to have, as its band range, a wavelength band corresponding to a half-value width in reflection in the optical reflectance spectrum thereof.

The cholesteric regularity means a state where molecular layers are configured in a spiral structure such that each of the layers is formed by molecules aligned in a single direction while adjacent molecular layers have alignment directions slightly shifted each other. It is normally possible to fix the cholesteric regularity by fixing a cholesteric liquid crystal phase. A polymer film obtainable by curing a cholesteric liquid crystal film is appropriately applicable.

The cholesteric regularity is normally obtainable by addition of an optical rotatory substance, such as a chiral dopant, having an asymmetric center or the like to a rod-like nematic liquid crystal or smectic liquid crystal.

A discotic liquid crystal having helical axes is obtainable by addition of a chiral to dopant to the discotic liquid crystal. The addition of the chiral dopant causes the liquid crystal molecules to be twisted such that the liquid crystal molecules are provided with an optical rotatory property. It is possible to modify the helical pitches of the chiral structure by controlling the concentration of the chiral dopant inducing the formation of a helical structure or changing the kind of the liquid crystalline compound or the chiral dopant. It becomes possible to reflect light having a specific wavelength by modifying the helical pitches. Preferably, the structure having cholesteric regularity has helical axes extending in a substantially normal direction to the principal face of the film. When only a broadband selective reflection film is used, the helical axes are preferred to be in perfect alignment with a normal direction to the principal face of the film. When a half-mirror and a broadband selective reflection film are used so as to be laminated, the helical axes may extend on average in a normal direction to the principal face of the film.

It has been known that a helical structure having cholesteric regularity reflects circularly polarized light having the same helical direction as the helical direction of light incident into the helical structure from a direction parallel to a helical axis (called selective reflection) and transmits circularly polarized light having a non-identical helical direction. In this case, the reflected circularly polarized light has a center wavelength λ represented by the product of the pitch p (μm) in the helical structure and an average refractive index n [av] of the liquid crystal on a plane orthogonal to the helical axis as shown in the following formula (1):

$$\lambda = p \times n[av] \qquad \text{(formula (1))}$$

The bandwidth W of the reflection is represented by the product of the birefringence and anisotropy Δn of the liquid crystal and p as shown in the following formula (2):

$$W = p \times \Delta n \qquad \text{(formula (2))}$$

As the method for achieving a wider bandwidth, there is a method for laminating a plurality of films having different helical pitches, i.e. different selective reflection bands to widen the bandwidth of the entire laminate. In this method, the films are normally laminated in the order of helical pitch size. As another method, there is a method for continuously varying the helical pitch size in a single layer. The examples of the method for continuously varying the helical pitch size in a single layer include a method for carrying out curing treatment in several times with at least one of an irradiation condition and alignment processing by heating being varied, and a method for separately performing a step for applying a curable liquid crystal composition and a step for carrying out the curing treatment in several times. These methods may be performed in combination.

The curable liquid crystal composition is, for example, a liquid crystal composition containing a nematic or smectic liquid crystalline compound having a polymerizable functional group, and a chiral dopant having a polymerizable functional group. The curable liquid crystal composition may be a liquid crystal composition containing a discotic liquid crystal and a chiral dopant. The chiral dopant does not necessarily contain a polymerizable functional group. The chiral dopant may contain a chiral dopant having a polymerizable functional group, and a chiral dopant having no polymerizable functional group in combination. The curable liquid crystal composition may partly contain a liquid crystalline compound having no polymerizable functional group. The liquid crystalline compound may be a low-molecular compound or a polymer.

The liquid crystal composition normally contains a polymerization initiator. The liquid crystal composition may contain a polymerization initiator, a polymerization inhibitor, an ultraviolet absorber, an oxidation inhibitor, a photostabilizer, a horizontal alignment agent, an unevenness preventive agent, a cissing preventive agent or the like, as required, in a range that does not adversely affect to the formation of a cholesteric liquid crystal phase. The addition of a plasticizer or the like is also applicable to enhance film strength.

Examples of the photostabilizer include hindered amines or a nickel complex, such as nickel bis(octylphenyl)sulfide, nickel complex-3,5-di-tert-butyl-4-hydroxybenzyl phosphate monoethylate, and nickel dibutyl dithiocarbamate. At least two of them may be used together. The content of a photostabilizer in the liquid crystal composition is preferably from 0.01 to 1 part by mass, particularly preferably from 0.1 to 0.3 parts by mass based on the total amount of 100 parts by mass of the liquid crystal compound.

Examples of the photopolymerization initiator include acetophenones, benzophenones, benzoins, benzyls, Michler's ketones, benzoin alkyl ethers, benzyl dimethyl ketals, phosphine oxides, and thioxanthones. A thermal polymerization initiator may be, for example, an azobis polymerization initiator, or a peroxide polymerization initiator. At least two of them may be used together. The content of a photopolymerization initiator or thermal polymerization initiator in the liquid crystal composition is preferably from 0.01 to 5 mass %, particularly preferably from 0.03 to 2 mass % based on the total amount of the liquid crystal composition.

The liquid crystalline compound having a polymerizable functional group is preferably one that exhibits a liquid crystal phase having a helical axis by addition of a chiral dopant, can fix the liquid crystal phase having a helical axis and can selectively reflect light in the visible light band.

A liquid crystalline composition at least containing a liquid crystalline compound having a polymerizable functional group, and a chiral dopant is applied on the support member 1. The liquid crystalline composition may contain a non-polymerizable liquid crystalline compound or a non-liquid crystalline polymerizable compound. The content of the chiral dopant is preferably from 1 to 30 mol % to the liquid crystal compound. When the liquid crystal composition has a solvent added thereto, the coated film is dried. The solvent is removed to put the treatment temperature under a certain condition, resulting in the formation of a cholesteric liquid crystal phase. In that state, polymerization is performed. The polymerization is performed by applying an external energy as mentioned above. The polymerization temperature is preferably in a range of at least −10° C. lower than the cholesteric liquid crystal phase-isotropic phase transition temperature (Tc) from the viewpoint of exhibiting the cholesteric liquid crystal phase in a stable manner. The polymerization is preferably performed as radical polymerization. A reaction where a volatile substance, such as water, is produced through polycondensation during polymerization or the like, or a reaction where a byproduct is produced to adversely affect a liquid crystal property is not preferable. Discotic liquid crystalline molecules may be polymerized by the method disclosed in JP-A-H08-27284 for example.

There is no particular limitation to the light source used during photoirradiation. For example, a tungsten lamp, a halogen lamp, a xenon lamp, a xenon flash lamp or a mercury lamp is applicable.

The liquid crystal composition contains the liquid crystalline compound having a polymerizable function group and the chiral dopant having a polymerizable function group in a total amount of preferably at least 75 mass %, more preferably at least 90 mass %. The liquid crystal composition contains the polymerizable liquid crystal compound in an amount of preferably at least 75 mass %, particularly preferably at least 85 mass %. The broadband selective reflection film 3 is produced via the above-mentioned processes. The broadband selective reflection film 3 is not limited to the above-mentioned examples or the ones produced by the above-mentioned production processes. For example, the liquid crystalline compounds or the production processes disclosed in WO-A-2010-143683, JP-A-2010-61119 or JP-A-2011-203436 are applicable.

The support member 1 and the broadband selective reflection film 3 are bonded together not via an air layer as mentioned above. Although there is no limitation to how to bond them as long as the measure to optically bond them together is used, both are bonded together preferably via a first transparent bonding material. As another mode, the broadband selective reflection film 3 may be applied directly on the support member 1 to bond the broadband selective reflection film 3 and the support member 1 together. An alignment film may be applied on the support member 1, followed by carrying out rubbing treatment, applying the curable liquid crystal composition on the alignment film to bond the broadband selective reflection film 3 and the support member 1 together.

The first transparent bonding material may be formed by a method for filling the first transparent bonding material in a liquid or paste form into a gap between the members to be bonded, or a method for laminating and bonding adhesive layers together. The first transparent bonding material may be, for example, a thermal plastic resin composition or a curable resin composition, which uses an acrylic resin, a urethane resin a silicone resin or another resin. When a curable resin composition is used, the curable resin composition is applied to one of bonding surfaces, and the one bonding surface is affixed to the other bonding surface, following by carrying out curing treatment. When a photocurable resin composition is used, activating light is applied. When a thermosetting resin composition, heat is applied. When a pressure sensitive adhesive layer is used, the pressure sensitive adhesive layer is applied or laminated to one of bonding surfaces, and the one bonding surface is affixed to the other bonding surface, following by applying a pressure to both bonding surface for bonding. The transparent material may contain a diffusion component in order to increase a viewing angle.

From the viewpoint of raising the visibility of a ray of display, the first transparent bonding material has a refractive index of preferably from 0.8 to 1.3 times, more preferably from 0.93 to 1.12 times the refractive index of a region of the support member 1 where the ray of display emits. The first transparent bonding material has a shear elastic modulus of preferably from $10^3$ to $10^7$ Pa, more preferably from $10^4$ to $10^6$ Pa at 25° C. The shear elastic modulus is particularly preferred to be from $10^4$ to $10^6$ Pa because voids caused at the time of bonding can be relatively easily lost.

The first transparent bonding material has a thickness of preferably at least 0.03 mm from the viewpoint that impact caused by an external force is sufficiently reduced to protect the display 2. The transparent bonding material has a thickness of preferably at most 2 mm, more preferably from 0.1 to 0.8 mm from the viewpoint of minimizing a reduction in the visibility of the display 2.

The first transparent bonding material has a thickness preferably set so as to be smaller than the pitch of display pixels. When there is a large optical path difference in a ray of display from the display 2 between light that passes through the optical thin film 5 and light that is reflected on the optical thin film 5 to be polarized and rotated and is totally reflected on the broadband selective reflection film 3, followed by being emitted toward a viewer via the optical thin film 5, the display image from the display 2 could appear as multiple images as observed from an oblique slant direction, not a front direction. From this point of view, it is more appropriate to decrease the bonding distance between the optical thin film 5 and the broadband selective reflection film 3 to reduce the optical path difference. In other words, it is more appropriate to adopt a method for reducing the thickness of the first transparent bonding material for bonding the optical thin film 5 and the broadband selective reflection film 3. It is preferred to set the thickness of the first transparent bonding material so as to be smaller than the pitch of the display pixels of the display 2 in order to effectively control the generation of the multiple images. The first transparent bonding material has a thickness of preferably at most ½, more preferably from 1/16 to ¼ of the pitch of the display pixels of the display 2.

In a mirror surface region except for a region for emitting a ray of display, the broadband selective reflection film 3 preferably has a light-shielding layer in a region that does not face the display 2. The color tone of the light-shielding layer is preferably dark in order to have a raised visibility as the mirror surface. When the display 2 emits no ray of display, the display 2 preferably has a tone similar to the tone that appears when the display 2 does not act as a display, in other words, the display 2 is in a black fashion, in order that the position of the display 2 is difficult to be visible from a front side.

When the display 2 is bonded to the broadband selective reflection film 3 via the air layer, the light-shielding layer is preferably formed so as to face the broadband selective reflection film 3 via the air layer as in the positional relationship between the display 2 and the broadband selective reflection film 3. Thus, the boarder between the region where the ray of display is emitted and the other region becomes difficult to be visible, resulting in the production of a mirror image in an integration mode.

The mirror surface display device 101 according to the first embodiment preferably includes a retainer not shown. The retainer is used to fix the support member 1 and the display 2 and retain both. The provision of the retainer can prevent the support member 1, the broadband selective reflection film 3 and the display 2 from causing misalignment. It should be noted that no misalignment could be caused between the support member 1 and the broadband selective reflection film 3 since both members are bonded together via the first transparent bonding material in the mirror surface display device 101 according to the first embodiment.

The retainer retains the support member 1 and the display 2 in a region other than the display surface of the display 2, such as a lateral surface of the device. Further, the retainer preferably has a light-shielding property. When the retainer has a light-shielding property, it is prevented that a ray of display from the display 2, or light reflecting in the mirror surface display device 101, such as light reflected on the broadband selective reflection film 3 or the like leaks outside, and that external light is incident from a side other than the front side.

In accordance with the mirror surface display device 101 according to the first embodiment, a circularly polarized component reflected on the broadband selective reflection film 3 in incident light passing through the support member 1 from the front side can be taken out forwardly since the mirror surface display device uses the broadband selective reflection film, which selectively transmits one of clockwise circularly polarized light and counterclockwise circularly polarized light and selectively reflects the other polarized light, and has cholesteric regularity. Thus, when the support member 1 has a high transmittance, it is possible to improve the brightness of the mirror surface as viewed from the front side. In such a case, the broadband selective reflection film 3 preferably has a large reflection band to reduce coloring of reflection light.

When the ray of display from the display 2 contains a polarized component, and when there is disposed a polarizing plate or a retardation plate which produces circularly polarized light passing through the broadband selective reflection film 3, almost of the entire ray of display can pass through the broadband selective reflection film 3. Part of the ray of display that has passed through the broadband selective reflection film 3 passes through the support member 1 and is taken out through the front surface of the support member. On the other hand, part of the ray of display that has reflected on the rear surface of the support member 1 reflects on the broadband selective reflection film 3 because the reflection light has an optically rotational direction reversed with respect to the helical axis of the cholesteric regularity formed in the broadband selective reflection film 3. The reflection light can pass through the support member to be taken out through the front surface of the support member. Afterward, reflection and passing-through are repeated in a similar way such that the ray of display can be taken out through the front surface of the support member to advantageously improve display luminance viewed from the front surface of the support member.

The effect inherent in the laminated structure according to the present invention is achieved by the reversal of the optically rotational direction of the ray of display that passes through the broadband selective reflection film 3 and is reflected on the rear surface of the support member 1, and by reflection of the ray of display that is repeatedly made on the broadband selective reflection film 3. An improvement in the reflectance of the incident light into the front surface achieved by the structure according to the present invention is limited to a circularly polarized component in a single direction achieved by the broadband selective reflection film 3. With regard to the ray of display, the optical thin film formed on the support member 1, however, has a reflectance of preferably at least 60%, more preferably at least 65% because it is possible to effectively take out the ray of display by disposing the polarizing plate or the retardation plate such that the ray of display passes through the broadband selective reflection film 3. With regard to the ray of display, it is possible to improve the transmittance by about from 15 to 25%, taking into account loss caused on the interface by repeated reflection and light absorption in the members.

When the support member 1 having the optical thin film 5 thereon has a reflectance of 68% and a transmittance of 20% for incident light having a wavelength of 550 nm, the entire mirror surface display device 101 has a reflectance of 69% and a polarized light transmittance of 39%. When the ray of display is polarized light, the total amount of the reflectance and the transmittance is substantially 108%, which is beyond 100%.

When the support member 1 having the optical thin film 5 thereon has a reflectance of 33% and a transmittance of 62% for incident light having a wavelength of 550 nm, the mirror surface display device 101 has a reflectance of 48% and a polarized light transmittance of 84%. When the ray of display is polarized light, the total of the reflectance and the transmittance amounts to 132%, which is beyond 100% in the same way. Nevertheless, a mirror surface display device having a reflectance of less than 50% has a limited application because of creating a dark mirror image.

When the mirror surface display device 101 according to the first embodiment includes no broadband selective reflection film 3 as in the prior art, the ratio of the reflectance to the transmittance (reflectance:transmittance) can be set to from 95:0 to 0:95 by optically designing the optical thin film 5 (dielectric thin film) formed on a support member 1. Nevertheless, it is impossible for the total of the reflectance and the transmittance to exceed 100% in this case.

The conventional mirror surface display devices have equipped with a high illuminance backlight to increase the luminance of a ray of display, which has necessitated the provision of a heat-radiating system which is capable of dealing with a service time or the quantity of generated heat. A light reflecting and transmitting member which the present invention applied thereto can release the heat generation of the display 2 since it is possible to raise the visibility of a ray of display without achieving a high luminance by use of a backlight or the like. For this reason, the present invention has a merit that it is possible to ensure required visibility without provision of a heat-radiating system. It should be noted that the present invention does not exclude the provision of a heat-radiating system and may adequately include a heat-radiating system as needed.

The present invention may use a display 3 having a difficulty in achieving a high illuminance but having a high dissolution, which advantageously improves the quality of a display image. In particular, in a method where the mirror surface display device is used to see a mirror image (reflection light) and a display image (ray of display) in contrast to each other, it is necessary to increase the resolution of the display image with respect to the mirror image having a high resolution without a boundary, which means that it is preferred to use the display 3 having a high resolution.

According to the light reflecting and transmitting member according to the first embodiment, it is possible to use the broadband selective reflection film to increase the total of the reflectance and the transmittance in comparison with the prior art, which means that there is a merit to increase a degree of freedom in design according to application or need.

The mirror surface display device 101 according to the first embodiment may be applied to a mirror surface display device as a mirror stand or a mirror in a fitting room in a shop, for example. The mirror surface display device according to the first embodiment may be appropriately applicable to a partition wall, a column-like building member with a mirror surface in a shop or the like. There is no limitation to how the mirror surface display device is used. The mirror surface display device may display an indoor advertisement or an indoor guide, sales information or the like on a partition wall, a column support or the like. The mirror surface display device may be also used to produce a representation having an excellent design.

The mirror surface display device 101 may include a sensor detecting the approach of a person and a reading function of reading tag information on a product therein to display information on the product on the mirror surface to the approaching person.

The mirror surface display device 101 may have a touch panel disposed on at least a part of the display surface of the display. The touch panel normally includes a touch panel sensor, a control circuit for detecting a contact position to the touch panel sensor, wiring and a FPC (flexible printed circuit). The light reflecting and transmitting member may be equipped with an input unit for the display by use of the touch panel. The touch panel sensor has a detecting area formed on a part of the support member 1 facing the display region of the display 2 such that the touch panel sensor serves as an area, where a contact or approach position is detected. When the touch panel is disposed, the touch panel sensor is preferably configured to be disposed between the support member 1 and the broadband selective reflection film 3. A non-contact motion sensor using infrared light or the like may be used as the touch sensor.

In a clothing shop, a customer can display his or herself on the display 2 such that he or she apparently tries on various pieces of clothing with different colors or designs to examine his or her appearance for various pieces of clothing. Moreover, in a fitting room of a clothing shop, a customer can try on clothing and examine his or her appearance from different angles by using a camera to be taken pictures and display the pictures on the mirror surface display device 101. Furthermore, the mirror surface display device may be used as a mirror installed in a shop to display product information, an advertisement or the like. The mirror surface display device is also applicable to various kinds of members including a building member, such as a wall member, a window member and a ceiling member, in addition to the above-mentioned examples.

Second Embodiment

Now, an example of the mirror surface display device according to another embodiment different from the first embodiment will be described. Hereinbelow, similar or identical members are denoted by identical reference numerals, and explanation of such members will be appropriately omitted. The mirror surface display device according to the second embodiment has the same basic structure and function as that according to the first embodiment except for the following items. Specifically, the second embodiment is different from the first embodiment in that a ray of display incident in a broadband selective reflection film 3 is circularly polarized light having the same circling direction as circularly polarized light that is allowed to selectively pass through the broadband selective reflection film 3. Although the display 2 according to the second embodiment is also applicable to various applications, explanation will be made about a case where the display is applied to a liquid crystal display.

Figure 3:
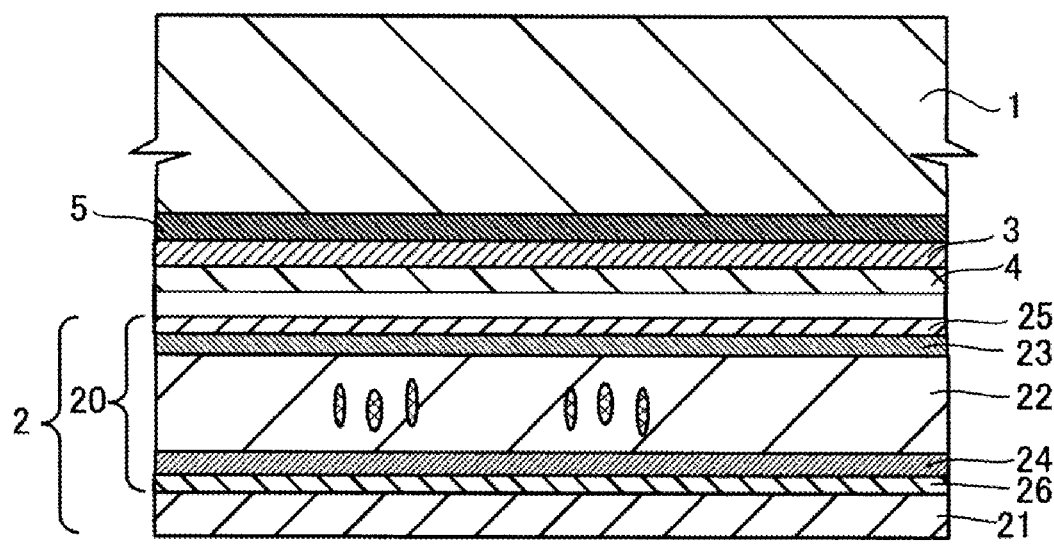
FIG. 3 is a schematic cross-sectional view of the mirror surface display device according to a second embodiment of the present invention.

As shown in FIG. 3, a mirror surface display device 102 includes an optical film between a liquid crystal display 20 and the broadband selective reflection film 3. The mirror surface display device 102 has a quarter-wavelength plate 4 disposed on a back surface of the broadband selective reflection film 3, i.e. on a part of the principal face of the broadband selective reflection film 3 facing to the display 2 to achieve a phase difference of ¼ wavelength. It is sufficient that the quarter-wavelength plate 4 turns a ray of display into circularly polarized light, and the quarter-wavelength plate may be advantageously a known film.

The display 2 includes the liquid crystal display panel 20 and a backlight unit 21. The liquid crystal display panel 20 has a liquid crystal layer 22 sandwiched between a pair of substrates 23 and 24, and the paired substrates have paired polarizing plates formed on outside principal faces such that a black representation can be made according to the direction that the paired polarizing plates are positioned. One of the polarizing plates close to the support member 1 is called a first polarizing plate 25, and the other is called a second polarizing plate 26. As described above, the liquid crystal display 20 may be bonded to the quarter-wavelength plate 4 via an air layer or via a transparent bonding material.

A ray of display emitted from the display 2 is turned into linear polarized light by the first polarizing plate 25. The linear polarized light is turned into counterclockwise circularly polarized light or clockwise circularly polarized light by the quarter-wavelength plate 4. The quarter-wavelength plate 4 is selected such that this circularly polarized light has the same circling direction as circularly polarizing light passing through the broadband selective reflection film 3. Thus, a ray of display emitted from the display 2 can be free from reflection loss at the broadband selective reflection film 3. This attributes to raise the visibility of the display 2.

In accordance with the mirror surface display device 101, a support member having a thin film formed thereon so as to reflect or transmit incident light as in a half mirror, and the broadband selective reflection film 3 are laminated, and the optical film is formed such that when a ray of display is incident on the broadband selective reflection film 3, the incident light is turned into circularly polarized light having the same circling direction as circularly polarizing light passing through a broadband selective reflection film. Thus, it is possible to raise the visibility of the ray of display with a mirror property being achieved.

When in a mirror surface region except for a region for emitting a ray of display, the broadband selective reflection film 3 has a light-shielding layer in a region that does not face the display 2, the light-shielding layer preferably has an optical film formed on a front surface thereof as well.

Third Embodiment

Figure 4:
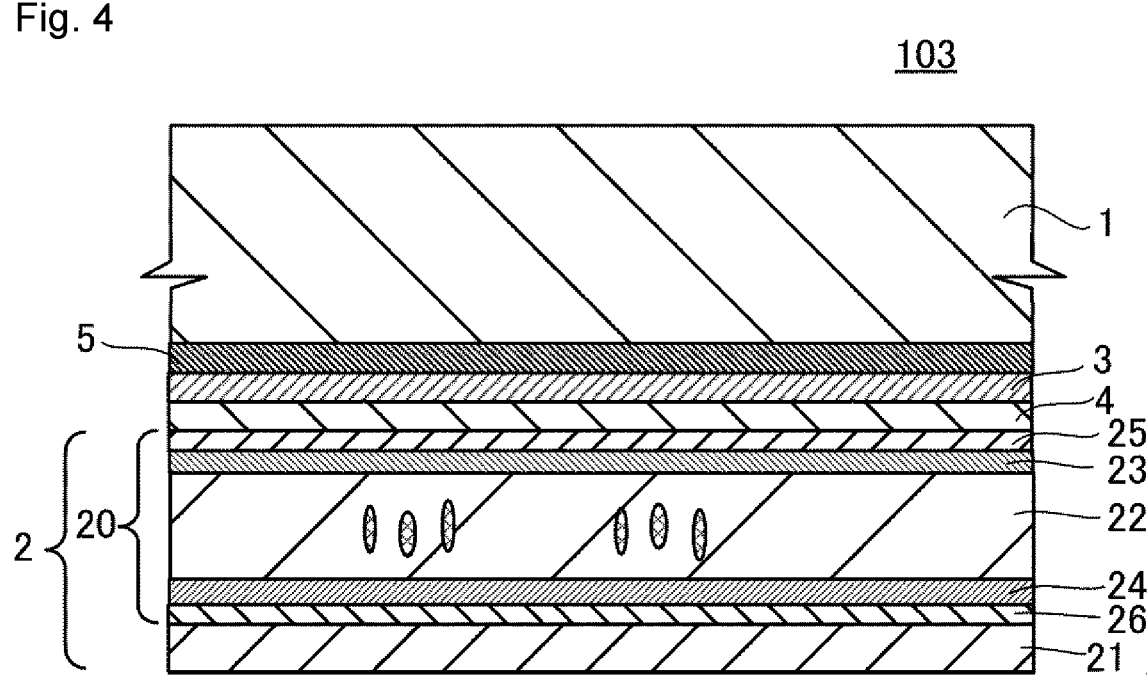
FIG. 4 is a schematic cross-sectional view of the mirror surface display device according to a third embodiment of the present invention.

An example of the mirror surface display device according to a third embodiment is shown in FIG. 4. The mirror surface display device 103 according to the third embodiment is the same as the mirror surface display device according to the first embodiment except that a broadband selective reflection film 3 and a display 2 are bonded together via a second transparent bonding material.

A second transparent bonding material may be a similar material to the above-mentioned first transparent bonding material. When the second transparent bonding material has a shear elastic modulus of at least $10^3$ Pa at 25° C., it becomes easy to maintain the shape of the second transparent bonding material. This arrangement allows the applied second transparent bonding material to maintain a thickness constant in its entirety even when the second transparent bonding material has an increased thickness. Thus, it becomes difficult to form a void in the interface between the display 2 and the transparent bonding material. When the second transparent bonding material has a shear elastic modulus of at least $10^4$ Pa at 25° C., it is possible to further reduce deformation. When the transparent bonding material has a shear elastic modulus of at most $10^7$ Pa at 25° C., it is possible to increase the bonding adhesion between the display 2 and a support member 1 (to be precise, a broadband selective reflection film 3 as a bonding surface) to prevent the display 2 from peeling from the support member 1. When the second transparent bonding material has a shear elastic modulus of at most $10^6$ Pa at 25° C., it become easy to reduce the generation of bubble when bonding the display 2 and the support member 1 (to be precise, the broadband selective reflection film 3 as a bonding surface).

When the display 2 is bonded to the broadband selective reflection film 3 via the second transparent bonding material, it is preferred that the broadband selective reflection film 3 have a light-shielding layer bonded thereto not via an air layer by direct printing or the like. Thus, the boundary between a region where a ray of display is emitted and the other region becomes difficult to be visually recognized from a front side, resulting in the production of a mirror image in an integration mode as in the first embodiment.

The above-mentioned first to third embodiments are examples of the mirror surface display device according to the present invention, and various variations and modifications may be made in a range not departing from the spirit on the scope of the present invention.

Figure 5:
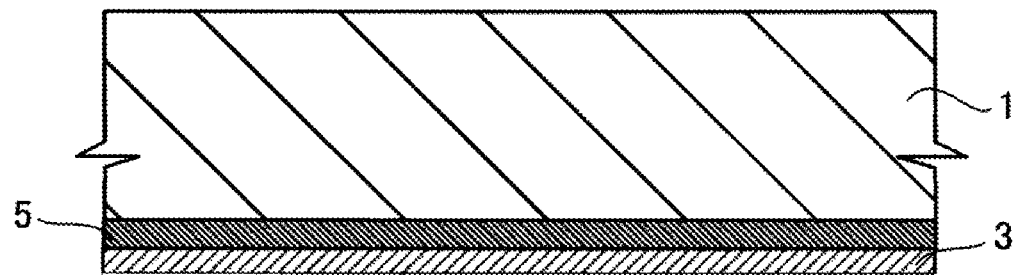
FIG. 5 is a schematic cross-sectional view of a light reflecting and transmitting member according to the present invention.

FIG. 5 is a schematic cross-sectional view of an example of the light reflecting and transmitting member according to an embodiment of the present invention.

The light reflecting and transmitting member 201 includes a support member 1 with an optical thin film 5 formed thereon, and a broadband selective reflection film 3. As shown in FIG. 5, the support member 1 and the broadband selective reflection film 3 is bonded together via a first transparent bonding material, not via an air layer. The materials or members described in various ways about the above-mentioned mirror surface display device are applicable to the support member 1, the broadband selective reflection film 3, the optical thin film 5, the first transparent bonding material and the like in the shown light reflecting transmitting member.

This application is a continuation of PCT Application No. PCT/JP2017/001801, filed on Jan. 19, 2017, which is based upon and claims the benefit of priority from Japanese Patent Application No. 2016-009265 filed on Jan. 20, 2016. The contents of those applications are incorporated herein by reference in their entireties.

REFERENCE SYMBOLS

1: Support member, 2: display, 3: broadband selective reflection film, 4: quarter-wavelength plate, 5: half mirror, 20: liquid crystal display panel, 21: backlight unit, 22: liquid crystal layer, 23 and 24: substrate, 25: first polarizing plate, 26: second polarizing plate, 101 to 103: mirror surface display device, 201: light reflecting transmitting member

What is claimed is:

1. A mirror surface display device comprising a support member having an optical thin film thereon, a broadband selective reflection film, and a display in this order;
   the optical thin film being formed on a surface of the support member facing the broadband selective reflection film; and
   the broadband selective reflection film comprises molecular layers which are configured in a spiral structure such that each of the molecular layers comprise liquid crystal molecules aligned in a direction while adjacent molecular layers have alignment directions of the liquid crystal molecules slightly turned to each other molecular layer,
   the spiral structure selectively more transmits one of clockwise circularly polarized light and counterclockwise circularly polarized light than the other circularly polarized light, and selectively more reflects the other circularly polarized light than the one of the circularly polarized light, and
   a ray of display incident on the broadband selective reflection film from the display comprises circularly polarized light having the same circling direction as circularly polarized light that is allowed to selectively pass through the broadband selective reflection film.

2. The mirror surface display device according to claim 1, wherein the support member and the broadband selective reflection film have a larger area than the display; and
the broadband selective reflection film has a light-shielding layer in a region that does not face the display.

3. The mirror surface display device according to claim 2, wherein the broadband selective reflection film and the display face each other via an air layer; and
the light-shielding layer faces, via an air layer, the region that does not face the display.

4. The mirror surface display device according to claim 3, further comprising a retardation film interposed between the broadband selective reflection film and the light-shielding layer.

5. The mirror surface display device according to claim 2, wherein the broadband selective reflection film and the display are bonded together via a second transparent bonding material, and the light-shielding layer is formed, not via the air layer, on the broadband selective reflection film in the region that does not face the display.

6. The mirror surface display device according to claim 5, wherein the broadband selective reflection film and the support member are bonded together via a first transparent bonding material, and the first transparent bonding material has a smaller thickness than a pitch of display pixels of the display, and
each of the first transparent bonding material and the second transparent bonding material has a refractive index of 0.8 to 1.3 times that of the support member, and a shear elastic modulus of $10^3$ to $10^7$ Pa at 25° C.

7. The mirror surface display device according to claim 1, wherein the broadband selective reflection film and the support member are bonded together.

8. The mirror surface display device according to claim 1, wherein the support member is made of a transparent material having a transmission of at least 20% in a visible light band.

9. The mirror surface display device according to claim 1, wherein the support member is made of inorganic glass.

10. The mirror surface display device according to claim 1, wherein the display comprises a liquid crystal display, and
the liquid crystal display includes a liquid crystal display panel and a light source for emitting light to the liquid crystal display panel, the liquid crystal display panel having a liquid crystal layer interposed between paired substrates, and paired polarizing plates formed on both outside principal faces of the liquid crystal display panel.

11. The mirror surface display device according to claim 1, wherein the optical thin film includes a dielectric multilayer film and has a light reflectance of at least 60% for a wavelength of 550 nm.

12. The mirror surface display device according to claim 1, wherein the broadband selective reflection film has a reflection band in wavelength of at least 150 nm.

13. The mirror surface display device according to claim 1, further comprising an air layer interposed between the optical thin film and the broadband selective reflection film.

14. The mirror surface display device according to claim 1, the support member and optical thin film comprise a half mirror.

15. The mirror surface display device according to claim 1, further comprises a quarter-wavelength plate disposed on a back surface of the broadband selective reflection film facing the display, wherein a ray of display incident on the optical plate from the display comprises linearly polarized light having and the circularly polarized light is produced from the linearly polarized light by the quarter-wavelength plate.

16. A method for displaying an image through a light reflecting and transmitting member comprising a support member having an optical thin film thereon, and a broadband selective reflection film in this order; and
the optical thin film being formed on a surface of the support member facing the broadband selective reflection film;
the broadband selective reflection film comprises molecular layers which are configured in a spiral structure such that each of the molecular layers comprise liquid crystal molecules aligned in a direction while adjacent molecular layers have alignment directions of the liquid crystal molecules slightly turned to each other molecular layer,
the spiral structure selectively more transmits one of clockwise circularly polarized light and counterclockwise circularly polarized light than the other circularly polarized light, and selectively more reflects the other circularly polarized light than the one of the circularly polarized light,
wherein the method comprises
emitting a ray of display incident on the broadband selective reflection film from a display, the ray comprises circularly polarized light having the same circling direction as circularly polarized light that is allowed to selectively pass through the broadband selective reflection film.

17. The method according to claim 16, wherein the light reflecting and transmitting member claimed is a window member.

* * * * *